United States Patent Office 2,886,561
Patented May 12, 1959

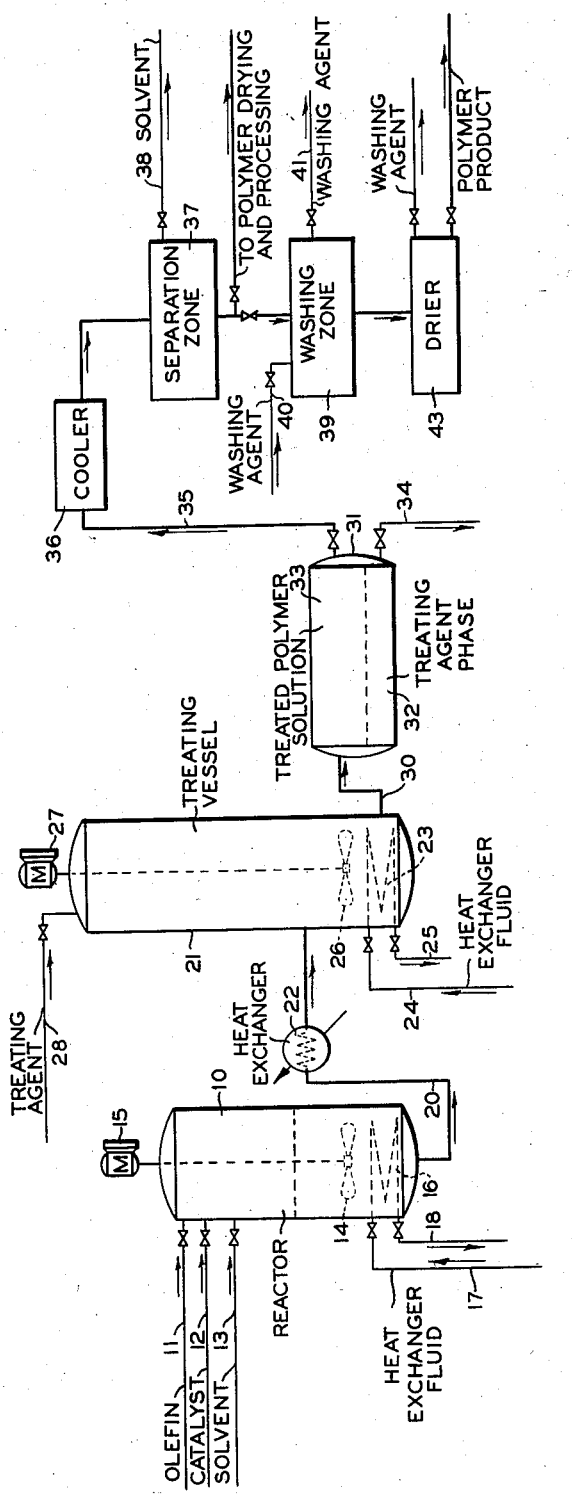

2,886,561

POLYMERS AND METHOD OF MAKING THE SAME

William B. Reynolds and Benedict H. Ashe, Jr., Bartlesville, Okla., assignors to Phillips Petroleum Company, a corporation of Delaware Application August 22, 1956, Serial No. 605,635

17 Claims. (Cl. 260—94.9)

This invention relates to polymers and method of making the same.

In the production of olefin polymers by catalytic polymerization, the product oftentimes has a tan or brown color and/or a high ash content.

Various treating methods have been proposed and tried by the prior art to overcome one or both of these problems. For example, Patent 2,699,457 to Ziegler and Gellert discloses washing the solid polymer with water, alcohol, acids, or caustic solutions as a method of removing bound metal portions of the catalyst. While such treatment may produce a white polymer, we have found that the yellow or tan color returns when the polymer is subjected to a molding or heating operation. Also, polymers produced by such treatment have an undesirably high ash content.

The same difficulties arise where the solid polymer is shaken with methanol, extracted with hydrochloric acid and then with acetone as disclosed in Ziegler Belgian Patent 533,362; where the solid polymer is treated with dilute acids, e.g., 10 to 15 percent hydrochloric acid with the addition of organic solvents such as ether or alcohol, as disclosed by German Patent 874,215 to Fischer; or by methanol washing and treating with dilute nitric acid at about 100° C. as disclosed by Ziegler Belgian Patent 534,792. In each case, polymers of undesirably high ash content are produced, and the undesirable tan or yellow color reappears after the material is subjected to heat, even though the material before such heating may be white.

As a practical matter, polymers of high ash content are quite undesirable because the ash contributes to poor electrical properties, for example, conductivity, dielectric constant, dissipation factor and the like. The reappearance of the tan or yellow color upon molding is, of course, obviously a highly undesirable feature. For some applications, low ash content is of paramount importance while, for other purposes the color is of primary significance. Some uses of course, require both a snow white color and a low ash content.

In accordance with this invention, the foregoing problems are eliminated or substantially minimized with resulting production of polymers of low ash content and/or having a desirable white color which is retained even after the polymer is subjected to a molding operation. This is accomplished by treating the polymer in solution, as distinguished from treating the polymer in the solid phase, with a treating agent immiscible with the polymer solution so as to form two separate and distinct phases. The treating agent, which normally is or comprises water, has the property of extracting impurities, such as catalyst, from the solvent-polymer phase and transferring them to the separate treating agent phase. The treating agent phase containing the impurities is separated from the polymer solution and the polymer is recovered from this latter solution.

This affects a very substantial reduction in the ash content of the polymer, far greater than can be attained by washing in accordance with prior techniques. Furthermore, the polymer which is recovered from the solvent phase is of improved color, which is retained when the polymer is subjected to a molding operation. The color improvement is far greater than that obtained by the washing treatments heretofore employed.

It is a feature of the invention that a slight additional improvement in ash content and a substantial additional improvement in color can be obtained by following up the solution treatment with one or more washing treatments of the polymer in the solid form, for example, with water, methanol, mixtures of water and methanol, caustic and other treating agents known to the prior art.

It will be understood that the initial solution treatment produces materials of very substantially lower ash content and improved color after molding compared to the finished polymers of the prior art. The additional improvement obtained by washing in our process is minor, compared to that produced by the initial solution treatment, but still of quite considerable commercial importance in the manufacture of many polymer products.

Accordingly, it is an object of the invention to provide an improved method of reducing the ash content of polymers wherein the color of the polymer, after being subjected to a molding operation, is greatly improved, compared to prior molded products.

It is a further object to provide an improved method of selectively extracting and removing impurities from polymers produced by catalytic action with specified catalyst systems.

It is a still further object to provide a practical, economical system for treating such polymers.

Various other objects, advantages and features of the invention will become apparent from the following detailed description taken in conjunction with the accompanying drawings, in which:

The figure is a flow diagram of a system embodying the invention.

In the following description, suitable conditions are given for the treatment of polyethylene in accordance with the invention, to provide a specific embodiment of the invention. It will be understood, of course, that these conditions will vary somewhat depending upon the material treated, the nature of the catalyst used in the polymerization, the amount of solvent used, and other operating conditions. Such variations will be apparent to those skilled in the art.

Referring now to Figure 1, ethylene; a catalyst charge comprising equal parts of triisobutylaluminum and titanium tetrachloride; and cyclohexane solvent are fed to a reactor 10 through lines 11, 12 and 13, respectively, at such rate as to provide a reactor effluent stream containing 6.6 percent by weight polyethylene, based on the total effluent. The concentration of the polymer in the effluent is not critical but it should be maintained below 20 percent by weight because the effluent becomes too viscous for convenience in subsequent treating if this percentage is exceeded. However, if the polymerization zone effluent contains more than the desired concentration of polymer, it can be further diluted prior to being treated by the process of this invention. With other polymers, usually of low molecular weight, a polymer concentration of up to 25 percent can be readily employed.

The amount of catalyst charged is 1 percent by weight based on the solution obtained. Of course, any amount of catalyst can be used which is sufficient to provide the polyethylene or other polymeric product, the amount used normally being from 0.01 weight percent to 5 weight percent or higher.

The reactor 10 is provided with a stirrer 14 driven by a motor 15 which is driven at such speed as to thoroughly agitate the contents of the reactor. Preferably and advantageously, the polymerization reaction is conducted in the mixed phase, i.e., the vessel is only partially liquid full. The reactor 10 is further provided with an internal coil 16 to which a heat exchange fluid is introduced through a line 17 and withdrawn through a line 18 so as to maintain the desired polymerization temperature in the reactor. In this example, the polymerization temperature is 175° F. However, the temperatures can vary over a broad range, say from −250° F. to +500° F., the more restricted range of 0 to +350° F. ordinarily being employed in commercial operation.

The pressure is maintained at 250 pounds per square inch gage. Here again, the pressure can vary within a wide range so long as the solvent is maintained in the liquid phase. In commercial operation, pressures of 30 to 500 pounds per square inch gage are ordinarily maintained.

The effluent is withdrawn from the reactor through a line 20 and passed to a treating vessel 21 wherein the treating agent is added.

It is essential that the treatment take place at a temperature where the polymer is in solution. Temperatures of 200 to 400° F. are suitable for such operation with polyethylene polymers having molecular weights in the range of 20,000 to 150,000. However, the solution temperature varies considerably with different polyethylenes and may be as low as 180° F. The solution temperature also varies considerably with different types of polymers and is not critical so long as the treatment takes place in solution. The solution temperature may be considerably lower for polymers of higher olefins. In order to maintain the temperature within the described limits, a heat exchanger 22 is provided in the line 20, and the vessel 21 is provided with a coil 23 to which heat exchange fluid can be introduced by a line 24 and withdrawn by a line 25.

The vessel 21 is further provided with a stirrer 26 driven by a motor 27 so that the contents of the vessel can be thoroughly agitated.

In accordance with the invention, a treating agent is introduced to the vessel 21 through a valved line 28. The types of treating agents which are applicable are those which are immiscible with the polymer solution so that two separate phases are formed, and which serve to extract impurities, such as catalyst, from the solvent phase. Water is an excellent treating agent, and produces a decided improvement as to ash content and/or color after molding of the finished polymer, as compared to the ash content and color after molding of polymers not treated in solution but merely washed in the solid phase with materials such as methanol, caustic, nitric or hydrochloric acid, and the like. While such a washing step, i.e. of the solid polymer, may be used as an additional added feature of the present treating process, the solution treatment is essential to obtain the marked lowering in ash content and/or improvement in color after molding obtained by the present process. Decided improvements are obtained whether the water is used by itself or in the form of aqueous solutions of a wide variety of materials, so long as the treatment is carried out on a solution of the polymer. In general, by far the best results are obtained with pure water, so this constitutes the preferred treating agent. A number of suitable treating agents will be discussed in detail hereinafter and the treating agent is introduced in the amount necessary to obtain the desired improvement. As little as 0.1 volume of water per volume of polymer solution gives improved results in some cases, although the amount of treating agent usually varies from 1.0 to 5.0 volume of treating agent per volume of polymer solution. In this example, the treating agent was water, and one volume was used per volume of polymer solution. The treating agent is maintained in contact with the polymerization effluent for 5 to 300 minutes although shorter or longer time can be used in some instances. The time of treatment can vary over a wide range, so long as adequate contact between the polymer and treating agent is maintained.

It will be understood that more than one solution treatment can be used, if desired. In this case, the treating agent phase is removed, and a fresh solution of treating agent is contacted with the once-treated polymer solution while maintaining a temperature such that the polymer remains in solution. These treatments can, of course, be conducted in separate vessels.

The effluent from vessel 21 is passed through a line 30 to a phase separation vessel 31 wherein a treating agent phase 32 separates from a treated polymer solution 33.

The aqueous phase is removed from the system through a valved line 34 while the treated polymer solution is passed through a valved line 35 to a cooler 36. From the cooler 36, wherein the polymer is precipitated, the material is passed to a separation zone 37, if desired, to separate any free solvent which may be present, the solvent being separated, as by filtration, and removed through a line 38 whence it can be purified, if necessary, and recycled to the polymerization zone. In some cases, a filter can be inserted in the line 35 to remove solid particles.

The polymer can then be fed directly to a drier or other processing, as desired.

Alternatively, from the solvent removal zone 37, the solid polymer is transferred to a washing vessel 39 to which a washing agent is introduced through a line 40 and withdrawn through a line 41. If desired, the effluent from the cooler 36 can be passed directly to the washing zone 39, with or without drying. The polymer is passed from the zone 39 to a drier 43, whence the finished product is recovered. Many variations in the treatment of the effluent from the vessel 31 will occur to those skilled in the art, and are embraced within the scope of the invention.

Advantageously, the polymer is agitated during the washing step, and it is advantageously in finely divided or comminuted form. The comminution can take place either before or during the washing step. This washing agent can be water, methanol, a mixture of water and methanol, dilute caustic solutions, dilute acid solutions such as a 5 percent solution of hydrochloric acid or nitric acid, or various other washing agents known to the prior art. The amount of washing agent used varies between 1 and 50 volumes of washing agent per volume of polymer, preferably 3–25 volumes. It will be understood that as many washing steps as desired can be utilized. Ordinarily, a distinct though minor improvement in the ash content and substantial improvement in color of the polymer after molding can be produced with a single washing step but two or more such steps are distinctly within the contemplation of the invention.

Although the final ash content and color attainable depend, to an important extent, upon the particular catalyst system employed, extensive comparative tests have demonstrated that a far greater improvement is produced in all cases with the method of the invention involving solution treatment, than is attained by washing of the solid polymer, whatever the final ash content and color of the molded products. As exemplary of results which can be obtained by practice of the invention, polyethylenes and polypropylenes having an ash content lower than 0.09 weight percent, for example 0.02 to 0.06 weight percent can be obtained depending on conditions of treatment and the catalyst system, compared to 0.2–0.3 weight percent or even higher for prior art washing processes.

When compression molded under a pressure of 2000 to 40,000 pounds per square inch, for example, 35,000 pounds per square inch, and at a temperature of 250 to 450° F., for example, 325° F. to form discs of polyethylene, a substantially white product suitable for use, among other things, as nursing bottles, containers and poker chips can be produced. These conditions can vary somewhat from the foregoing ranges depending on the particular polymer being treated, molecular weight of the polymer and other variables. Also, when the material is extruded onto a wire in the formation of electrical conductors, the same desirable white color is observed and, due to the low ash content of the polymer, the electrical properties, specifically dissipation factor, are greatly enhanced.

The treatment process of the invention is applicable to polymers, as hereinafter defined, prepared by polymerization in the presence of a two or more component catalyst wherein one component is an organometal compound, including those where one or more organo groups is replaced by a halogen; a metal hydride; or a metal of group I, II or III; and the second component is a group IV to VI metal compound, e.g., salt or alcoholate. The organometal compounds referred to include without limitation, alkyl, cycloalkyl or aryl compounds of di, tri or tetravalent metals particularly aluminum, zinc, barium, lead and tin or such organometal compounds where one or more of the alkyl, cycloalkyl, or aryl groups is replaced by a halogen atom and/or a hydrogen atom. The alkyl groups can be quite large, compounds being applicable with fifteen or more carbon atoms in each alkyl, cycloalkyl or aryl group and forty or more carbon atoms in the molecule. Specific examples of such compounds are triethylaluminum, triisobutylaluminum, a mixture of diethylaluminum chloride and ethylaluminum dichloride, sometimes referred to herein as ethylaluminum sesquichloride, diethylaluminum hydride, ethylaluminum dichloride, or diethylaluminum chloride, taken alone, trioctylaluminum, tridodecylaluminum, triphenylaluminum, triphenylgallium, diphenylberyllium, dicyclohexylberyllium, cyclohexylzinc chloride, tetraphenyllead, tetraethyltin, and $CH_3AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$, $C_{20}H_{41}GaBr_2$, $(C_{14}H_{29})_2GaF$, $(C_6H_5)_2InCl$, $C_8H_{17}InF_2$, $(C_6H_{11})InBr_2$ (cyclohexane derivative), $C_{17}H_{35}BeI$, $CH_3BeBr$ and the like.

The metal hydrides can include, as specific examples, aluminum hydride, lithium aluminum hydride, barium hydride, gallium hydride, indium hydride, sodium aluminum hydride, potassium beryllium hydride.

The metals of the first, second and third groups are applicable as a class, the most important members being sodium, magnesium and aluminum.

The compounds of a metal of group IV to VI of the periodic system include the oxides, hydrides, halides, oxyhalides, and salts of organic acids, usually having twenty or less carbon atoms, such as formic acid, of the group IV to VI metals such as titanium, zirconium, chromium, thorium, molybdenum and vanadium.

The alcoholates of a metal of group IV of the periodic system which can be employed conform to the formula $X_nM(OR)_m$, where $m+n$ equals the valence of the metal M, X is a halogen, and R is an organic radical usually having twenty or less carbon atoms, and preferably being an alkyl, cycloalkyl or aryl group. Specific examples of such alcoholates are titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl)titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichloro diethyl titanate $(Cl_2Ti(OC_2H_5)_2)$, monochloro triethyl titanate $(ClTi(OC_2H_5)_3)$ and dichloro diethyl zirconate $(Cl_2Zr(OC_2H_5)_2)$. Also included are such compounds as $Hf(OCH_3)_4$ $$Th(OC_3H_7)_4$$

$Th(OC_6H_5)_4$, $Cl_3Ti(OC_6H_4CH_3)$, $Zr(OC_4H_7)_4$ $$Cl_2Hf(OC_{10}H_{21})_2$$

$Th(OC_6H_{13})_4$, and $Zr(OC_{12}H_{25})_4$.

A third catalyst component which can be used advantageously is an organic halide or metal halide where the organic radical has thirty or less carbon atoms, and is advantageously an alkyl, cycloalkyl or aryl group. Specific examples are ethyl bromide, ethyl trichloro titanium, 1-bromobenzene, cyclohexyl chloride. Also applicable are an alkali metal or ammonium halide, an aluminum halide (where the catalyst also includes another metal compound such as a titanium compound), a halogen, a hydrogen halide, a complex hydride, a mixture of an organic halide and a metal, and Grignard reagent.

A still more specific subgroup of catalysts where excellent color and low ash content are obtained by the practice of the invention include catalysts where an organometal compound is used in combination with a metal salt. The ratios of the catalyst components can vary widely, depending upon the particular charge used and operating conditions, say from 0.02 to 50 mols of the first component per mol of the second catalyst component. If a third component is present, the amount can vary from 0.02 to 50 mols per mol of the second component.

Examples of suitable catalyst systems in accordance with the foregoing disclosure are as follows:

(a) Aluminum trialkyls, e.g., triethylaluminum or triisobutylaluminum and the tetravalent metal halides of the type represented by titanium tetrachloride;

(b) An organic halide (such as ethyl bromide), a group IV inorganic halide (such as titanium tetrachloride), and a low valence metal selected from the group consisting of alkali metals, beryllium, magnesium, zinc, cadmium, mercury, aluminum, gallium, indium and thallium, for example, magnesium, ethyl bromide and titanium tetrachloride, as such, or with the addition of metallic aluminum;

(c) A group IV halide, for example, titanium tetrachloride, and a low valence metal identified in (b), for example, sodium or magnesium;

(d) A mixture of titanium hydride and an organometal compound exemplified by aluminum alkyl halide, i.e., a mixture of titanium hydride and ethylaluminum sesquichloride;

(e) Titanium dioxide and an organometal compound such as trialkylaluminum and aluminum alkyl chlorides, e.g., a mixture of titanium dioxide and ethylaluminum sesquichloride;

(f) A mixture of molybdenum pentachloride and organometal compounds and halides exemplified by triethylaluminum and ethylaluminum dichloride;

(g) A mixture of complex metal halides, exemplified by potassium fluotitanate, and an organometal compound and halides exemplified by triethylaluminum and diethylaluminum chloride;

(h) A mixture of a derivative selected from the oxides of molybdenum, alkali metal and ammonium molybdates, and an organometal compound or halide exemplified by triisobutylaluminum and isobutylaluminum dichloride;

(i) A mixture of a derivative of iridium, platinum and osmium selected from the group consisting of halides, oxides and complex compounds or iridium, platinum and osmium, said complex compounds corresponding to the formula $M_xM'X_y$, wherein M is an alkali metal or an ammonium radical, M' is iridium, platinum or osmium, X is a halogen, and y is at least 1 and the sum of x and y is equal to the valence of M' and a metallic organic compound exemplified by triethylaluminum, for example, iridium chloride and triethylaluminum or ethyl-aluminum sesquichloride;

(j) At least one derivative selected from the group consisting of oxides, halides, and oxyhalides of vanadium and complex salts of said halides with a member selected from the group consisting of ammonium halide and an alkali metal halide, and an organometal compound exemplified by triethylaluminum, for example, vanadium oxide and triethylaluminum;

(k) A mixture of a derivative of a group IV metal selected from the group consisting of halides, oxyhalides, hydroxyhalides, oxyhydroxyhalides of a metal selected from the group consisting of molybdenum, tungsten, uranium, selenium, tellurium, and polonium, and complex salts of said halides and said oxyhalides with a member selected from the group consisting of halides of sodium, potassium, lithium, rubidium, cesium and ammonia and an organo-metal compound exemplified by triethylaluminum, for example, molybdenum pentachloride and ethylaluminum dichloride;

(l) A chromyl halide and at least one of the following (1) a metal hydride or an organometal compound, (2) an organometal halide, and (3) a mixture of an organic halide and a metal, for example, chromyl chloride, ethyl bromide and magnesium;

(m) (1) a titanium derivative, (2) a complex hydride and (3) a halide of aluminum, for example, tetrabutyl titanate, lithium aluminum hydride and aluminum chloride;

(n) At least one halide of titanium, zirconium or hafnium and at least one hydride of lithium, sodium, potassium, rubidium, cesium, magnesium, calcium, strontium, barium, lanthanum or thorium, for example, zirconium tetrachloride and calcium hydride;

(o) (1) a hydrocarbon derivative of one of the metals, zinc, cadmium, mercury, and magnesium and (2) a member selected from the group consisting of halides of titanium, zirconium, vanadium and molybdenum, oxyhalides of titanium, zirconium, vanadium, molybdenum and chromium, and complex salts of said halides and oxyhalides with a member selected from the group consisting of halides of the alkali metals and ammonia, for example, diethylzinc and titanium tetrachloride;

(p) (1) An organo derivative of a group IV-A metal, (2) a hydride or organo compound of a metal of groups II to VIII, inclusive, and (3) a member selected from the group consisting of halogens and hydrogen halides, for example, triethylaluminum, titanium butoxide, and bromine;

(q) (1) A tri- or tetrahalide of titanium, zirconium, hafnium and germanium, (2) an organophosphorus-containing compound, and (3) at least one of the following (a) an organometal halide, (b) a mixture of an organic halide and a metal and (c) a complex hydride, for example, triethylaluminum, titanium tetrachloride and triphenyl phosphine;

(r) (1) A tri- or tetrahalide of titanium, zirconium, hafnium and germanium, (2) a peroxide of the formula R'OOR' where R' is hydrogen, alkyl, aralkyl, alkaryl, cycloalkyl, acyl, alkyne, or aryl and (3) at least one of the following: (a) an organometal halide (b) a mixture of an organic halide and a metal and (c) a complex hydride; for example, ethylaluminum sesquichloride, titanium tetrachloride and benzoyl peroxide;

(s) (1) A tri- or tetrahalide of titanium, zirconium, hafnium and germanium, (2) a metal alkoxide, and (3) at least one of the following: (a) an organometal halide, (b) a mixture of an organic halide and a metal, and (c) a complex hydride: for example, ethylaluminum sesquichloride, aluminum ethylate and titanium tetrachloride;

(t) (1) a halide of titanium, zirconium, hafnium or germanium, (2) a hydride selected from the group consisting of hydrides of aluminum, gallium, indium and thallium and complexes of said hydrides with alkali metal hydrides and (3) an organic halide: for example, titanium tetrachloride, lithium aluminum hydride and ethyl bromide;

(u) (1) A halide of titanium, zirconium, hafnium, or germanium, (2) carbides and acetylenic compounds, and (3) at least one of the following: (a) an organometal halide, (b) a mixture of an organic halide and a free metal, and (c) a complex hydride: for example, ethylaluminum sesquichloride, titanium tetrachloride, and copper acetylide.

The materials which are polymerized, in accordance with this invention, are polymerizable hydrocarbons, broadly. Preferably, the polymerizable hydrocarbons are olefins containing a $CH_2=C<$ radical. The most preferred class of polymerizable hydrocarbons used is olefins which are members of the ethylene series having up to and including eight carbon atoms per molecule. However, the polymerizable hydrocarbons used in the process of this invention also include di- and polyolefins in which the double bonds are in non-conjugated positions. Specifically, ethylene has been found to polymerize to a solid polymer immediately upon being contacted with such catalyst compositions. Examples of other polymerizable hydrocarbons which can be used in the process of this invention are propylene, 1-butene, 1-hexene, and 1-octene. Branched chain olefins can also be used, such as isobutylene, as well as 1,1-dialkyl-substituted ethylenes. Examples of the di- and polyolefins in which the double bonds are in non-conjugated positions and which can be used in accordance with this invention are 1,5-hexatriene, 1,4-pentadiene and 1,4,7-octatriene. Mixtures of the foregoing polymerizable hydrocarbons can be polymerized to a solid polymer in the presence of the described catalysts as, for example, by copolymerizing ethylene and propylene, ethylene and 1-butene, propylene and 1-butene, or propylene and a pentene. Also, aryl olefins, e.g., styrene and alkyl-substituted styrenes can be polymerized to a solid polymer in the process of this invention.

This invention is also applicable to the polymerization of a monomeric material comprising conjugated dienes containing from 4 to 8 or more carbon atoms. Examples of conjugated dienes which can be used include 1,3-butadiene, isoprene, 2,3-dimethylbutadiene, 2-methoxybutadiene, 2-phenylbutadiene and the like. It is also within the scope of the invention to polymerize such conjugated dienes either alone or in admixture with each other and/or with one or more other compounds containing an active $CH_2=C<$ group which are copolymerizable therewith. Examples of such monoolefins are listed above. Examples of other compounds containing the active $CH_2=C<$ group include styrene, acrylonitrile, methyl acrylate, methyl methacrylate, vinyl chloride, 2-methyl-5-vinylpyridine, 2-vinylpyridine, etc.

Suitable solvents for use in the polymerization process are paraffins, cycloparaffins and/or aromatic hydrocarbons which are relatively inert, non-deleterious and liquid under the conditions of the process. The lower molecular weight alkanes, such as propane, butane, and pentane are especially useful when the process is carried out at low temperatures. However, the higher molecular weight paraffins and cycloparaffins, such as isooctane, cyclohexane, methylcyclohexane, and aromatic diluents, such as benzene, toluene, and the like, can also be used, particularly when operating at higher temperatures.

Specific examples of materials which form a separate phase when admixed with solutions of olefin polymers in a hydrocarbon diluent, and which can be used as treating agents in the method of this invention, are water and glycerol.

Aqueous solutions of water-soluble organic and inorganic compounds can also be used as treating agents in the method of this invention, for example, mineral acids, alkali metal and ammonium hydroxides, alkali metal salts of organic acids, aliphatic alcohols, aliphatic ketones, aliphatic organic acids, and esters of aliphatic alcohols with aliphatic acids.

Specific examples of treating agents are aqueous solutions of the following materials: nitric acid, hydrogen chloride, hydrogen bromide, sulfuric acid; the hydroxides of sodium, potassium, lithium, rubidium and cesium, and ammonium hydroxide; sodium acetate, lithium formate, potassium butyrate, sodium maleate, potassium benzoate; methyl alcohol, ethyl alcohol, isopropyl alcohol, tert-butyl alcohol, amyl alcohol; dimethyl ketone, ethyl methyl ketone, methyl propyl ketone, diethyl ketone; formic acid, acetic acid, propionic acid; ethyl acetate, methyl formate, ethyl propionate and ethyl butyrate. Generally speaking, water solutions of aliphatic alcohols containing up to and including eight carbon atoms, aliphatic ketones containing up to and including six carbon atoms, aliphatic organic acids containing up to and including five carbon atoms, and aliphatic alcohol esters of aliphatic organic acids containing up to and including six carbon atoms are suitable.

The above listed compounds are not intended to limit the method of the present invention to these compounds, as any material can be used as a treating agent in the present process which forms a separate phase when admixed with solutions of olefin polymer in a solvent and is capable of extracting impurities, such as catalyst, from the solvent phase and transferring them to the treating agent phase. In a similar manner, when water is employed as the major component of the treating agent, any water-soluble inorganic or organic compound which does not adversely affect the polymer which is dissolved in the hydrocarbon can be used, either in aqueous solution, or even as a suspension or dispersion in water. Such compounds must be substantially insoluble in the hydrocarbon diluent, or, they must be so slightly soluble in the hydrocarbon that this hydrocarbon solubility is overshadowed by the solubility of these compounds in water.

This is a continuation-in-part of our copending application, Serial Number 576,135, filed April 4, 1956.

EXAMPLE I

Ethylene was polymerized to high molecular weight solid polymer by the following procedure.

A solution of 0.953 gram of triisobutylaluminum in 400 cubic centimeters of cyclohexane was fed to a stainless steel charge vessel which was maintained under positive nitrogen pressure. The contents of this charge vessel were then pressured into a one-half gallon stainless steel reactor which had been previously flushed with nitrogen. A solution of 0.75 gram of titanium tetrachloride in 400 cubic centimeters of cyclohexane was then charged to the reactor in the same manner, after which 200 cubic centimeters of cyclohexane was charged by the same manner to rinse all of the catalyst into the reactor. The reactor was then flushed three times with ethylene at atmospheric temperature and 200 pounds pressure.

The reactor was fitted with a jacket which contained decalin, and this jacket system was provided with a circulating system incorporating means for heating and cooling the decalin. In addition, the reactor was supplied with an internal coil through which cooling water could be passed.

The reactor was then pressured to 40 p.s.i.g. with ethylene at a temperature of 85° F. Heat was then supplied to the reactor to raise the temperature of the reactor contents to 200–210° F. The pressure was maintained at 40 p.s.i.g. until 210° F. was reached, this increase in temperature requiring 29 minutes. Ethylene was then pressured into the reactor until a pressure of 300 p.s.i.g. was reached, and this pressure was maintained by adding additional ethylene until the polymerization reaction was essentially complete. This polymerization period required three hours and fifteen minutes, and during this time, the temperature was maintained at 210° F. At the end of the polymerization period, additional heat was supplied to the reactor to raise the temperature to 250° F. this heating period requiring thirty minutes. Five minutes later, a sample of the polymer solution in the reactor was withdrawn through a dip tube. This sample of polymer, after precipitation from solution, was labeled Sample 1. Three hundred cubic centimeters of cyclohexane was then charged to the reactor, resulting in the reactor contents being cooled somewhat, so additional heat was supplied to again raise the reactor temperature to 250° F. Thirty minutes after Sample 1 was withdrawn, five hundred cubic centimeters of distilled water was charged to the reactor. Additional heat was again supplied to bring the temperature back up to 250° F., and fifteen minutes after the water was charged, the stirrer with which the reactor was fitted was turned on. Thirty-three minutes later, the stirrer was turned off, and after five more minutes, the water phase was drained from the reactor. After twelve more minutes, five hundred cubic centimeters of distilled water was charged to the reactor and heat was again supplied to raise the temperature to 250° F. This heating period required twelve minutes. The stirrer was again turned on, and after thirty minutes agitation, the stirrer was turned off. The water phase was again drained from the reactor, and twelve minutes after the stirrer was turned off, five hundred cubic centimeters of distilled water was charged to the reactor. After an eleven minute heating period to raise the temperature to 250° F., the stirrer was again turned on, and the reactor contents were agitated for thirty minutes. The stirrer was then turned off, the water phase was drained from the reactor, and the heat source was removed and cooling water was circulated through the cooling coil.

When the reactor contents had cooled to 120° F., the cover was removed from the reactor, and the polymer was recovered from the reactor. Only solid polymer was visible in the reactor, since all of the diluent (cyclohexane) was present in the swollen polymer. This sample of polymer was labeled Sample 2.

The sample previously labeled as 1 was split into four portions, these portions being labeled A, B, C and D. Sample 2 was split into two portions, labeled as samples E and F. Samples A and E were dried at 160° F. in a vacuum oven overnight. Sample B (solid polymer) was washed twice in a Waring Blendor with methyl alcohol, employing approximately one liter of methyl alcohol in each wash. This sample was then dried in the same manner employed for A and E. Solid polymer identified as sample C was refluxed with five hundred cubic centimeters of a solution containing five percent by weight of concentrated hydrochloric acid in methyl alcohol for one hour. This sample was then dried as previously described. Sample D, in solid form, was refluxed with five hundred cubic centimeters of a five percent by weight aqueous nitric acid solution for one hour, after which it was rinsed three times with five hundred cubic centimeters of water in each wash. This rinsing was carried out in the flask, each rinse requiring approximately five minutes. This sample was also dried by the previously described procedure. Sample F was washed twice in a Waring Blendor with distilled water, each wash utilizing one liter after which it was dried by the drying procedure employed previously. Table I lists the yield of polymer and lists the amount of polymer in each differently treated sample.

Table I

| Sample | | Grams |
|---|---|---|
| A | Untreated | 8.7 |
| B | Methyl Alcohol Treatment | 19.0 |
| C | Hydrochloric Acid Treatment | 10.3 |
| D | Nitric Acid Treatment | 11.3 |
| E | Water Solution Treatment | 56.8 |
| F | E+Water Wash of Solid Polymer | 63.6 |
| Total Yield | | 169.7 |

The calculated solution concentration during the treatment of the solution with distilled water was 8.2 weight percent polymer. The volumes of water employed per volume of polymer solution was calculated to be 1.38.

Table II gives the ash and color of discs of each of the above prepared samples, these samples being made by compression molding at 325° F.

Table II

| Sample | | Ash Weight, Percent | Color |
|---|---|---|---|
| A | Untreated | 0.34 | Mottled Grey. |
| B | Methyl Alcohol Treatment | 0.29 | Grey. |
| C | Hydrochloric Acid Treatment | 0.31 | Yellow. |
| D | Nitric Acid Treatment | 0.32 | Yellow. |
| E | Water Solution Treatment | 0.087 | Greyish-white. |
| F | E+Water Wash of Solid Polymer | 0.072 | White. |

EXAMPLE IA

A solution of 1.7 grams of ethylaluminum sequichloride in 400 cubic centimeters of cyclohexane was charged to the reactor of Example I by the same charging procedure. A solution of 0.5 gram of tetrabutyl titanate in 400 cubic centimeters of cyclohexane was then charged to the reactor by the same procedure. Two hundred cubic centimeters of cyclohexane was then rinsed into the reactor in the same manner described in Example I. The reactor was then flushed three times with ethylene at atmospheric temperature and two hundred pounds pressure.

The reactor was then pressured to 50 p.s.i.g. with ethylene at a temperature of 90° F., and heat was supplied to the reactor to raise the temperature to 200° F. Sixty-five minutes were required to raise the temperature of the reactor contents to 200° F., during which time the pressure was maintained constant at 50 p.s.i.g. When the temperature had reached 200° F., ethylene was pressured into the reactor until a pressure of 300 p.s.i.g. was reached. The temperature and pressure were then maintained at 250° F. and 300 p.s.i.g. for ninety minutes, this period of time being the actual polymerization period. At the end of this time, three hundred cubic centimeters of cyclohexane was charged to the reactor, and a fifteen minute heating period was required to raise the temperature to 250° F. Five minutes later, a sample of the polymer solution was withdrawn from the reactor. This sample of polymer, after precipitation from solution, was split into four portions, these portions being labeled samples A, B, C and D. Three hundred cubic centimeters of cyclohexane was then charged to the reactor, and heat was supplied to the reactor for ten minutes to again raise the temperature to 250° F. Five hundred cubic centimeters of water was then charged to the reactor, requiring another five minute heating period to bring the temperature up to 250° F. The stirrer was then turned on, and the reactor contents were agitated for thirty minutes, at which time the stirrer was turned off. The water phase was then drained from the reactor, this draining requiring eight minutes. Two minutes later, five hundred cubic centimeters of distilled water was charged to the reactor, and a five minute heating period was employed to again raise the temperature to 250° F. at which time the stirrer was turned on. Agitation was maintained for thirty minutes, after which the water phase was drained, this draining period requiring seven minutes. Once again five hundred cubic centimeters of water was charged to the reactor, and after a six minute period, the temperature of the reactor contents was 250° F. At this point, the stirrer was turned on, and agitation was continued for thirty minutes. At the end of this time, the stirrer was turned off, the water phase was drained, the heat source was turned off, and cooling water was circulated through the cooling coil.

After the reactor had cooled to 120° F., the reactor was opened, and the polymer was removed. All of the diluent in the reactor was found to be taken up by the swollen polymer. This polymer was split into two portions, these portions being labeled samples E and F.

The above prepared samples were then treated by the following procedure.

Sample A was dried as is, with no further treatment, while sample B was washed twice in the solid phase in the Waring Blendor at ambient temperature, utilizing one liter of methyl alcohol in each wash. This sample was then dried. Sample C (in solid state) was refluxed with five hundred cubic centimeters of a solution of five weight percent concentrated hydrochloric acid and methyl alcohol for one hour, after which it was dried. Sample D in solid form was refluxed with five hundred cubic centimeters of a five percent by weight aqueous nitric acid solution for one hour, after which the sample was rinsed three times in the flask with five hundred cubic centimeters of water being employed in each rinse. The time required for each rinse was five minutes. This sample was then dried. Sample E was dried as it was recovered from the reactor after the solution treatment, while sample F (polymer in solid phase) was washed twice in the Waring Blendor with distilled water, employing one liter of water in each wash. This sample was then dried. The drying step for each of the above samples comprised an overnight period in a vacuum oven at 160° F.

Table III lists yield, ash content, and color, the color being determined after the samples had been formed into discs by compression molding at 325° F.

Table III

| Sample | | Grams | Ash Weight Percent | Color |
|---|---|---|---|---|
| A | Untreated | 20.6 | 0.68 | Mottled Grey. |
| B | Methyl Alcohol Treatment. | 19.0 | 0.202 | Greyish White. |
| C | Hydrochloric Acid Treatment. | 25.7 | 0.54 | Yellowish White. |
| D | Nitric Acid Treatment. | 23.6 | 0.57 | Yellowish White. |
| E | Water Solution Treatment. | 21.5 | 0.029 | Slightly Mottled White. |
| F | E+Water Wash of Solid Polymer. | 20.4 | 0.016 | White. |
| Total Yield. | | 130.8 | | |

The polymer solution at the time it was treated with distilled water was calculated to contain 7.0 weight percent dissolved polymer. The volumes of water employed per volume of polymer of solution was calculated to be 1.98.

EXAMPLE IB

One and seven-tenths gram of ethylaluminum sesquichloride, 0.5 gram of tetrabutyl titanate and a total of one liter of cyclohexane were charged to the reactor of the previous examples by a procedure identical to that employed in Example IA. The reactor was then flushed three times with ethylene at atmospheric temperature and 200 pounds pressure.

The reactor was then pressured to 50 p.s.i.g. with ethylene at a temperature of 90° F., and heat was supplied to the reactor to raise the temperature to 200° F. After sixty-seven minutes, the temperature had reached 200° F., and additional ethylene was supplied to raise the pressure to 300 p.s.i.g. This temperature, 200° F., and pressure, 300 p.s.i.g., were maintained in the reactor for two hours and 19 minutes, at which time 300 cubic centimeters of cyclohexane was charged to the reactor. A seventeen minute heating period was then employed to raise the temperature to 250° F. Four minutes later, an additional three hundred cubic centimeters of cyclohexane was charged to the reactor, and a thirty-seven minute heating period was employed to raise the temperature to 255° F. At this time, a sample of the polymer solution was withdrawn from the reactor through a dip tube. After precipitating the polymer from this sample of the polymer solution, the solid polymer was split into four portions, these portions being labeled A, B, C and D. Two minutes later, three hundred cubic centimeters of cyclohexane was charged to the reactor, and a four minute heating period was required to raise the temperature to 230° F. Five hundred cubic centimeters of distilled water was then charged to the reactor, and a five minute heating period was employed to raise the temperature to 250° F. The stirrer was then turned on, and the mixture was agitated for fifteen minutes, after which the stirrer was turned off and the water phase was drained from the reactor. Ten minutes were required to drain the water phase and two minutes later, five hundred cubic centimeters of distilled water was charged to the reactor. After an eight minute heating period to again raise the temperature to 250° F., the stirrer was turned on, and the mixture was agitated for fifteen minutes. The stirrer was then turned off, and twenty minutes were required to drain the water phase from the reactor. Three minutes later, five hundred cubic centimeters of distilled water was charged to the reactor, and, after a two minute heating period to raise the temperature to 250° F., the reactor contents were agitated for fifteen minutes. The stirrer was then turned off, and ten minutes were required to drain the water phase. After two more minutes, five hundred cubic centimeters of distilled water was again charged to the reactor, and a three minute heating period was required to bring the temperature back up to 250° F. The mixture was again agitated for fifteen minutes, after which the stirrer was turned off and the water phase drained. The draining required five minutes, and after four more minutes, five hundred cubic centimeters of distilled water was charged to the reactor, and a six minute heating period was required to bring the temperature to 250° F. The mixture was then agitated for fifteen minutes, the stirrer was turned off, and the water phase was drained. The draining required nine minutes, and after two more minutes, five hundred cubic centimeters of distilled water was again charged to the reactor. Following a four minute heating period to raise the temperature to 250° F., the reactor contents were agitated for fifteen minutes. The stirrer was then turned off, the water phase was drained, the heat was turned off, and cooling water was circulated through the cooling coil of the reactor.

After the reactor contents had cooled to 120° F., the reactor was opened, and the polymer, swollen with diluent, was removed from the reactor. This polymer was then split into two portions, these portions being labeled E and F.

Sample A was then dried as is, and sample B in solid phase was washed twice in a Waring Blendor with methyl alcohol, employing one liter of methyl alcohol in each wash. Sample B was then dried. Sample C in solid phase was refluxed with a five percent by weight solution of concentrated hydrochloric acid in methyl alcohol as previously described, and sample D was refluxed with five percent aqueous nitric acid as previously described. These samples were then dried. Sample E, after the solution treatment, was dried with no further treatment, while sample F, after the solution treatment, was washed twice in solid form in a Waring Blendor with one liter of distilled water being used in each wash. The drying step for each of the above described samples comprised an overnight period in a vacuum oven at 160° F. Table IV lists the yield, ash content, and color of the above prepared samples. The color of these samples was determined from discs which had been compression molded at 325° F.

Table IV

| Sample | | Grams | Ash Weight Percent | Color |
|---|---|---|---|---|
| A | Untreated | 13.3 | 0.63 | Grey. |
| B | Methyl Alcohol Treatment. | 16.0 | 0.185 | Grey. |
| C | Hydrochloric Acid Treatment. | 15.5 | 0.33 | Mottled Grey. |
| D | Nitric Acid Treatment. | 18.2 | 0.58 | Yellow. |
| E | Water Solution Treatment. | 44.0 | 0.032 | Grey-White. |
| F | E+Water Wash of Solid Polymer. | 34.3 | 0.022 | White. |
| Total Yield. | | 141.3 | | |

The polymer solution at the time of treatment with distilled water was calculated to contain 7.8 weight percent dissolved polymer. The volumes of water employed per volume of polymer solution was calculated to be 2.36.

EXAMPLE II

Ethylene was polymerized to high molecular weight solid polymer by the following procedure.

A solution of 2.0 grams of triisobutylaluminum in approximately 600 cubic centimeters of cyclohexane was fed to a small stainless steel charge vessel which was maintained under positive nitrogen pressure. The contents of this charge vessel were then pressured into a one-gallon stainless steel reactor which had been previously flushed with nitrogen. A solution of 2.0 grams of titanium tetrachloride in approximately 600 cubic centimeters of cyclohexane was then charged to the reactor in the same manner, after which sufficient cyclohexane was charged through the charge vessel to the reactor to bring the total cyclohexane in the reactor up to 2000 cubic centimeters. The reactor was then flushed three times with ethylene at atmospheric temperature (70° F.) and 200 pounds pressure.

The reactor was fitted with a jacket through which hot or cold Decalin could be circulated to control the temperature of the reaction mixture. In addition, the reactor was supplied with an internal cooling coil through which cooling water could be passed.

Polymerization was then initiated by pressuring the reactor to 40 p.s.i.g. with ethylene. Polymerization was then allowed to continue, and at various intervals, additional ethylene was pressured in. After four hours and 28 minutes, heat was supplied to the reactor by means of the Decalin heating jacket to raise the temperature to 250° F., which was reached fifty minutes later. During the four hour and 28 minute period, the pressure varied from a minimum of 40 p.s.i.g. to a maximum of 310 p.s.i.g., and the temperature varied from a minimum of 80° F. to a maximum of 215° F. After the reactor reached 250° F., a portion of the polymer solution was removed from the reactor. The remainder of the reactor contents were blown down into a six gallon stainless steel solution treatment vessel which contained six liters of cyclohexane and five liters of distilled water. The stirrer with which the solution treatment vessel was fitted was turned on, and 2.5 liters of cyclohexane was rinsed through the reactor and pressured into the solution treatment vessel 35 minutes after the original charge to this vessel. After fifty-five minutes of contacting the polymer solution with water, the stirrer was turned off, and ten minutes later, the water phase was removed. Seven minutes later, five liters of distilled water was pressured in (preheated to 250° F.), and the stirrer was turned on. After twenty-three minutes, the stirrer was turned off, and after ten more minutes, the water phase was withdrawn. Fifteen minutes later, the vessel contents were blown down into an aluminum vacuum chamber.

The solid polymer was recovered from the portion of the polymer solution which was removed from the reactor at the end of the polymerization run as indicated above. A portion of this solid polymer was washed twice in a Waring Blendor using approximately two liters of methanol in each wash. The remainder of this solid polymer which was not water washed was not treated further. The polymer which had been treated in solution with water in the solution treatment vessel was not treated further. These samples were then analyzed for ash content, and the color of a portion of each of these samples which had been compression molded at 325° F. was determined visually. The total yield of polymer was 435.1 grams, of which 197.1 grams was recovered from the first portion of solution removed from the reactor, and of this portion, 52.9 grams were washed with methyl alcohol in a Waring Blendor. The amount of polymer which was recovered after water washing in solution was 238 grams. The calculated solution concentration during water treatment was 3.08 weight percent polymer while the volume of treating agent per volume polymer solution was 1.015. The results of these runs are expressed below in Table V.

*Table V*

| Sample | Treatment | Ash Weight Percent | Color |
|---|---|---|---|
| A | Blown down from reactor—no further treatment. | 0.38 | Brown, badly mottled. |
| B | Blown down from reactor—solid washed with MeOH in blendor. | 0.207 | Brown, mottled |
| C | Water washed in solution treatment vessel—no further treatment. | 0.037 | Light tan, slightly mottled. |

EXAMPLE III

Ethylene was polymerized to high molecular weight solid polymer according to the procedure described in Example II. The catalyst components employed were 1.0 gram of triisobutylaluminum and 1.0 gram of titanium tetrachloride.

After purging with ethylene, the reactor was pressured to 50 p.s.i.g. with ethylene at a temperature of 70° F. After fifteen minutes, the temperature in the reactor was 170° F. and the pressure was 100 p.s.i.g. Addition of the ethylene was continued and after five more minutes the temperature was 160° F., and the pressure was 30 p.s.i.g. The amount of ethylene which had been added up to this time was 68 grams (0.15 lbs.). After five more minutes, five hundred cubic centimeters of distilled water was pressured into the reactor, after which heat was supplied by means of the Decalin to raise the reactor temperature to 325° F. Thus, 0.604 parts by volume of water were added per volume of catalyst solution in the reactor. The increase in temperature to 325° F. required fifty minutes. After the temperature of the reactor reached 325° F., this temperature was maintained for two hours. After this period, heating was discontinued and the cooling water was circulated through the internal cooling coil. During the two-hour period at 325° F., the contents of the reactor were stirred vigorously by an electric stirrer. After the reactor had cooled to room temperature, the excess unreacted ethylene was vented from the reactor. Two separate phases were observed in the reactor. The water phase was withdrawn and discarded, and the polymer-diluent phase was recovered. The solid polymer recovered from the solution was then washed three times with distilled water in a Waring Blendor (one liter of water for each wash), after which the polymer was dried overnight in a vacuum oven at 160° F. The yield of polymer from this run was seventy-five grams. A molded sample of the polymer recovered from this run molded at 325° F. under compression, was found to be substantially white, and the ash content of this polymer was found to be 0.012 percent by weight.

A number of runs were made employing the same catalyst charge, amount of diluent and treating agent, and polymerization conditions, but varying the temperature at which the water and polymer solution were contacted. These runs are expressed below as Table VI. Run 1 in Table VI is the run described in the first part of this example.

*Table VI*

| | Run No. | | | |
|---|---|---|---|---|
| | 1 | 2 | 3 | 4 |
| Treating Temp., °F | 325 | 250 | 180 | 150. |
| Yield, grams | 75 | 73 | 63 | 73. |
| Melt Index | | 9.911 | 5.076 | 10.708. |
| Molecular Weight (by melt index) | | 26,100 | 31,500 | 25,800. |
| Ash (Weight percent) | 0.012 | 0.0098 | 0.22 | 0.32. |
| Vol. Treating Agent/Vol. Polymer Solution | 0.605 | 0.605 | 0.613 | 0.605. |
| Color of samples compression molded at 325° F. | White | White, very slightly mottled. | Yellowish Grey. | Yellow. |

Runs 1 and 2 illustrate the superior polymers that result when the polymer is treated in solution according to the method of this invention. This superiority of the thus produced polymers is evidenced by the low ash content and their substantially white color which is retained after compression molding at 325° F.

Molded samples of polymers treated at a temperature such that not all of the polymer was in solution had a high ash content and a yellow color, as shown in runs 3 and 4.

EXAMPLE IV

A series of runs was made according to the procedure of Example II. In these runs, ethylene was polymerized to high molecular weight solid polymer using the same catalyst charge, diluent charge, and conditions previously described. In these runs, the amount of ethylene charged to the reactor was varied so as to vary the yield of solid polymer. Such a variation in polymer production produced solutions of varying polymer concentration which were contacted with water (500 cubic centimeters in each run) at 250° F. In each of these runs, the solid polymer after recovery from the diluent was washed three times with distilled water in a Waring Blendor (one liter of water for each wash), after which the polymer was dried overnight in a vacuum oven at 160° F.

The results of a number of these runs are expressed below as Table VII.

*Table VII*

| | Run No. | | |
|---|---|---|---|
| | 2 | 5 | 6 |
| Yield, grams | 73 | 100 | 132. |
| Solution, Concentration (Weight percent—Calculated) | 11.1 | 14.6 | 18.4. |
| Vol. Treating Agent/Vol. Polymer Solution | 0.605 | 0.587 | 0.564. |
| Ash—Weight, percent | 0.0098 | 0.024 | 0.04. |
| Melt Index | 9.911 | 6.391 | 3.209. |
| Molecular Weight by Melt Index | 26,100 | | |
| Inherent Viscosity | | 1.552 | 1.501. |
| Molecular Weight by Inherent Viscosity | | 37,945 | 36,700. |
| Color of Compression Molded Sample at 325° F. | White, very slightly mottled. | White, very slightly mottled. | White, slightly greyish cast. |

The above described runs show that polymer solutions of varying concentrations and polymers of different molecular weights can be treated according to the method of this invention to produce polymers of low ash content having a desirable low ash and which do not become discolored when subjected to compression molding.

EXAMPLE V

Three runs were made in which ethylene was polymerized to high molecular weight solid polymer using the same catalyst charge, diluent charge, and conditions as employed in Example II, except that the time during which the polymer solution was contacted with water was varied. The results of these three runs are expressed below as Table VIII. In each run, five hundred cubic centimeters of water was used and the treatment of the polymer solution was carried out at 250° F. In each of these runs, the solid polymer, after recovery from the diluent, was washed three times with distilled water (one liter in each wash), after which the polymer was dried overnight at 160° F.

*Table VIII*

|  | Run No. | | |
|---|---|---|---|
|  | 2 | 7 | 8 |
| Treating Time (Minutes) | 120 | 60 | 3-4.[1] |
| Vol. Treating Agent/Vol. Polymer Solution | 0.605 | 0.611 | 0.606 |
| Ash—Weight percent | 0.0098 | 0.029 | 0.020 |
| Melt Index | 9.911 |  | 12.451 |
| Molecular Weight (by melt index) | 26,100 |  |  |
| Color of Compression Molded Sample at 325° F. | White, very slightly mottled. | White | White |

[1] In this run, the water was charged and stirred with the other materials in the reactor for sixty minutes, but the temperature was maintained at 250° F. for only 3-4 minutes. Thirty-eight minutes were required to heat the reactor contents at 250° F. after addition of the water, and after 3-4 minutes, the cooling water was turned on. The temperature at the time of water phase removal, nineteen minutes later, was 110° F.

The above runs illustrate that the time of treatment in which polymer solutions are contacted with a treating agent can vary over wide limits.

EXAMPLE VI

A series of runs was made in which ethylene was polymerized to high molecular weight solid polymer by means of a catalyst system comprising ethyl-aluminum sesquichloride and tetrabutyl titanate.

A cylindrical reaction vessel provided with a stirrer, a water condenser on an outlet line, through which was circulated acetone cooled to Dry Ice temperature, inlets for purified nitrogen and ethyl chloride, and a thermocouple well, was purged with nitrogen and charged with 150 grams of aluminum turnings. The inlet tube for the ethyl chloride reached nearly to the bottom of the reactor in order that it would discharge ethyl chloride below the surface of the reaction mixture. Throughout the run a slow but steady flow of nitrogen through the vessel was continued so as to insure an inert atmosphere.

The temperature of the reactor was raised to 70° C., after which the addition of ethyl chloride was started. After the reaction started, ethyl chloride was introduced at such a rate that the condenser did not flood and the temperature was maintained at 120-150° C. The product which first formed served as a medium for the remainder of the reaction. Addition of ethyl chloride was continued over an 8-hour period and was then stopped. The liquid product which formed remained liquid when the mixture was allowed to stand overnight at room temperature. The next day the mixture was heated to 120° C., and the addition of ethyl chloride was resumed, the rate being regulated as before to maintain the temperature at 120-150° C. When ethyl chloride cased to be consumed as evidenced by a decrease in temperature, addition was discontinued.

All but approximately one hundred cubic centimeters of the liquid product was removed from the reactor, and maintained in a nitrogen atmosphere. This product was then distilled at 72-75° C., at a pressure of 4 mm. mercury. The purified product was a colorless liquid which had a chlorine content of 47.4 weight percent. The theoretical chlorine content for an equimolar mixture of diethylaluminium chloride and ethylaluminum dichloride is 43 weight percent. The resulting substantially equimolar mixture of diethylaluminum chloride and ethylaluminum dichloride (referred to as ethylaluminum sesquichloride herein), was then dissolved in cyclohexane to provide a solution containing 0.24 gram of the sesquichloride per cubic centimeter of solution.

Five hundred cubic centimeters of cyclohexane was charged to a three-necked flask, after which the flask was flushed with prepurified nitrogen. Eight cubic centimeters (1.94 gram of $Et_3Al_2Cl_3$) of the ethylaluminum sesquichloride solution, prepared above was then added to 42 cubic centimeters of cyclohexane (all under prepurified nitrogen), and this mixture was then poured into the three-necked flask while flushing with nitrogen. Fifty-six hundredths gram of tetrabutyl titanate was then pipetted into the flask. The contents of the flask were then poured through a funnel into a stainless steel charge vessel which was maintained under positive nitrogen pressure.

The contents of the charge vessel were then pressured into a one-gallon stainless steel reactor which had been previously flushed with nitrogen. An amount of cyclohexane solvent was then charged to the reactor through the same charge vessel used for the introduction of the catalyst mixture. The amount of cyclohexane charged in this manner was that amount necessary to reach the total amount of diluent required, e.g., 1500 cubic centimeters. The reactor was then flushed three times with ethylene at atmospheric temperature and 200 pounds pressure. Heat was then supplied to the reactor by circulating heated Decalin through the heating jacket and addition of ethylene was continued as polymerization continued. After 60 minutes, the temperature had risen from an initial level of 80° F. to 180° F. and the pressure had risen from an initial level of 40 p.s.i.g. to 260 p.s.i.g. At this point, the addition of ethylene to the reactor was stopped, and it was found that 147.5 grams of ethylene had been charged to the reactor. At this time, heating of the reactor was discontinued, and the cooling water was turned on. The reactor was cooled to 120-130° F. and one liter of a water-methanol mixture containing 127 cubic centimeters of methanol was pressured into the reactor. The reactor contents were then heated to 325° F., and the polymer solution and water phase were contacted with stirring at this temperature for four hours. At the end of this time, the water phase was withdrawn, and then the reactor was cooled to room temperature. The solid polymer which precipitated was separated from the diluent by filtration, and this solid polymer was washed with three separate washes in a Waring Blendor using one liter of distilled water, one liter of a 50-50 water-methanol mixture, and one liter of methanol. The polymer was then dried overnight in a vacuum oven at 160° F. The yield of polymer from this run was 116.5 grams, and this polymer had an ash content of 0.041 percent by weight. This run is listed as run 9 in Table IX.

Two other runs were made in which essentially the same conditions were employed except that different treating agents were employed. The results of these runs are expressed in Table IX.

*Table IX*

|  | Run No. | | |
|---|---|---|---|
|  | 9 | 10 | 11 |
| Treating Agent | 10% by Wt. MeOH in $H_2O$. | $H_2O$ | 10% by Wt. Acetic acid in $H_2O$. |
| Amount of Treating Agent, cc. | 1,000 | 1,000 | 1,000 |
| Vol. Treating Agent/Vol. Polymer Solution | 0.617 | 0.632 | 0.626 |
| Treating Time (Minutes at treatment temperature) | 240 | 120 | 120 |
| Yield, grams | 116.5 | 80.4 | 94 |
| Ash, weight percent | 0.041 | 0.057 | 0.061 |
| Color of Compression molded sample, 325° F. | Light grey | Light grey | Medium grey |

A control run was made using the same amounts of ethylaluminum sesquichloride, tetrabutyl titanate and diluent. In this run, the reaction time was 170 minutes, while the temperature and pressure was essentially the same as in the runs in Table IX above. The polymer from this run was chopped with one liter of cyclohexane in a Waring Blendor, the cyclohexane was filtered off, and the polymer was divided into two portions. One of the portions was washed with five percent aqueous nitric acid in a three-necked flask at 212° F. for sixty minutes, after which the polymer was washed with water on a filter. The other portion was washed at 122° F. for eighty minutes with a five percent solution of concentrated hydrochloric acid in methyl alcohol followed by a water wash. The sample which had been washed with nitric acid had an ash content of 0.515 weight percent, while the polymer which was washed with hydrochloric acid in methanol had an ash content of 0.152 weight percent. An untreated sample had an ash content of 0.74 weight percent. The color of the nitric acid treated sample was yellowish brown. The color of the hydrochloric acid-methanol (MeOH-HCl) treated sample (molded) was yellowish grey, and the untreated sample (molded) had a brown color.

EXAMPLE VII

A series of runs was made in which ethylene was polymerized to high molecular weight solid polymer employing the catalyst system of Example VI. In these runs, 1.44 gram of aluminum sesquichloride was employed, and the amount of tetrabutyl titanate was 0.42 gram. The amount of diluent employed in these runs was 750 cubic centimeters of cyclohexane, while the reaction conditions were essentially the same as those of Example VI. In these runs, the polymer solution was contacted with different treating agents in each run. The treating temperature employed in these runs was 325° F., and the treating time was 2 hours. The results of a number of these runs are expressed below in Table X. In each of these runs, the solid polymer which was recovered was washed three times in a Waring Blendor, employing three liters of water in the first wash, two liters of a 50/50 methyl alcohol-water mixture in the second wash, and three liters of methyl alcohol in the third wash.

Table X

| | Run No. | | |
|---|---|---|---|
| | 12 | 13 | 14 |
| Treating Agent | n-butyl alcohol in H₂O. | ethyl acetate in H₂O. | acetaldehyde in H₂O. |
| Amount of Treating Agent, cc. | 63 alcohol, 450 H₂O. | 55.5 ethyl acetate, 450 H₂O. | 64 acetaldehyde, 450 H₂O. |
| Vol. treating agent/Vol. polymer Solution. | 0.636 | 0.625 | 0.636. |
| Yield, grams | 54.8 | 58.5 | 57.0. |
| Ash, weight percent | 0.053 | 0.036 | 0.02. |
| Melt index | | 0.349 | |
| Molecular weight (by melt index). | | 56,500 | |
| Inherent viscosity | 3.632 | | 5.029. |
| Molecular weight (by inherent viscosity). | 88,805 | | 122,960. |
| Color of compression molded samples, 325° F. | Grey | White | Grey. |

EXAMPLE VIII

Ethylene was polymerized to high molecular weight solid polymer following the procedure of Example II. The catalyst system consisted of 1.94 grams of ethylaluminum sesquichloride and 0.12 gram of chromyl chloride. The total amount of diluent employed in this run was 1500 cubic centimeters of prepurified cyclohexane. After the catalyst and diluent had been charged, the reactor was flushed three times with ethylene at atmospheric temperature and 200 pounds pressure. The reactor was then pressured to 220 p.s.i.g. with ethylene, at which point the temperature was 85° F. After five minutes, the pressure had risen to 230 p.s.i.g., and the temperature had risen to 90° F. The ethylene was shut off at this point, and it was found that 139 grams (0.306 lb.) of ethylene had been charged to the reactor.

The reaction was allowed to continue for one more hour, at which time heat was supplied to the reactor by means of the Decalin heating system. After 45 minutes, the temperature in the reactor had reached 200° F., and the pressure was 200 p.s.i.g. After an additional hour, the temperature had fallen to 180° F., while the pressure had remained constant.

At this point, 1,000 cubic centimeters of distilled water was pressured into the reactor and the stirrer was turned on. The temperature quickly rose to 200° F., and stirring was maintained for one hour, while the reactor and its contents were at this temperature and pressure. The stirrer was then turned off, and after 30 minutes, the water phase was removed from the reactor. An additional 1,000 cubic centimeters of distilled water was pressured in after 15 minutes, and the stirrer was turned on. The reactor conditions at this point were 200° F. and 200 p.s.i.g. This contacting of the polymer solution with water was carried out for 35 minutes, at which time the stirrer was turned off. The contents of the reactor were then allowed to cool overnight without stirring. The solid polymer which precipitated during the cooling period was separated from the water and liquid hydrocarbon phases. The solid polymer was washed twice in the Waring Blendor using one liter of distilled water in each wash, and then dried overnight at 160° F. in a vacuum oven. The yield of polymer from this run was seventy-one grams, and this polymer had an ash content of 0.084 weight percent. The calculated polymer solution concentration at the time of treatment was 6 percent, while the calculated ratio of volumes of treating agent per volume of polymer solution was 1.27. The inherent viscosity of this polymer (in tetralin) was 5.920, and the molecular weight based on this inherent viscosity was 144,745. A sample of this polymer was molded by compression molding at 325° F. The color of a molded sample of this polymer was yellowish grey.

An ethylene polymerization run was made by essentially the same procedure described above using two grams of ethylaluminum sesquichloride, 0.1 gram of chromyl chloride and four hundred cubic centimeters of heptane (diluent). The maximum temperature during this polymerization run was 36° F., while the maximum pressure reached was 555 pounds per square inch. The reaction time was one hour, and a yield of 105 grams of polymer was realized. The solid polymer formed was washed in a Waring Blendor with methyl alcohol (approximately one liter). The washed polymer had an ash content of 0.294 percent by weight and a compression molded sample (325° F.) of this polymer had a dark yellow-brown color.

EXAMPLE IX

Ethylene was polymerized to high molecular weight solid polymer by a catalytic polymerization employing a catalyst system comprising lithium aluminum hydride and titanium tetrachloride. This polymerization was carried out by the following procedure.

Two-tenths gram of lithium aluminum hydride (solid) was charged dry to a one-gallon stainless steel reactor, after which the hydride was covered with 300 cubic centimeters of cyclohexane. The reactor was then closed, and a solution of two grams of titanium terachloride in 200 cubic centimeters of cyclohexane was then charged to the reactor by means of the pressure charge tank described in the previous examples. One thousand cubic centimeters of cyclohexane was then charged through the charge tank to the reactor to rinse any catalyst which had adhered to the walls of the system into the reactor. The reactor was then flushed three times with ethylene at 200 p.s.i.g., after which the reactor pressure was bled down to 0 p.s.i.g. Heat was then supplied to the reactor by means of a decalin heating system, and after 47 minutes, the temperature had reached 200° F. The pressure at this point was still 0 p.s.i.g. Ethylene was then pressured into the reactor until the reactor pressure had reached 300 p.s.i.g. After four minutes, the ethylene addition was stopped, and the temperature was found to be 190° F. The pressure at this point was 300 p.s.i.g. The reaction was then allowed to continue for 39 minutes, at which time the temperature was 200° F. and the pressure was 220 p.s.i.g. The reactor was then repressured with ethylene to 300 p.s.i.g., and after five more minutes, the ethylene was again shut off. The temperature and pressure at this point were 200° F. and 280 p.s.i.g. The total amount of ethylene which had been charged since the beginning of the run was found to be 144 grams.

The reaction was allowed to continue for 95 minutes, at which point 1,000 cubic centimeters of distilled water was pressured into the reactor. The temperature and pressure at the time of the water addition were 200° F. and 40 p.s.i.g. The polymer solution and water were agitated together for one hour, after which the stirrer was turned off. After 30 minutes, the water phase was removed, and after 20 more minutes, an additional 1,000 cubic centimeters of distilled water was pressured in. After 30 minutes of agitation, the stirrer was turned off and after 30 more minutes, the water phase was removed and the excess ethylene was vented. The temperature of the reactor throughout the water treating steps was 280° F. The reactor was then allowed to cool to room temperature, and the polymer was recovered. A portion of the solid polymer was washed twice in a Waring Blendor using one liter of distilled water for each wash. The other portion of the polymer was dried directly after removing the polymer from the reactor. The total yield of polymer from this run was 111.1 grams, and it was calculated from this value that the polymer solution concentration at the time of water treatment was 8.7 weight percent. It was also calculated that the ratio of volumes of treating agent per volume of polymer solution was 1.24. The portion of the polymer which was dried without washing in the Waring Blendor had an ash content of 0.06 weight percent. The melt index for this unwashed polymer was 64.5, representing a molecular weight of 19,300. The portion of the polymer which was washed in the Blendor had an ash content of 0.042 weight percent. Both the polymer washed and unwashed in the solid form had, after molding, a white color, the washed sample being slightly mottled and the unwashed sample being somewhat more mottled.

EXAMPLE X

Ethylene was polymerized to high molecular weight solid polymer by a catalytic polymerization employing a catalyst system of vanadium tetrachloride and triisobutylaluminum. This catalytic polymerization was carried out by the following procedure.

One and twenty-five hundredths grams each of vanadium tetrachloride and triisobutylaluminum were charged to a one-gallon stainless steel reactor by the charging procedure described in Example II. The total amount of diluent employed in this run was 1500 cubic centimeters of cyclohexane. After the catalysts and diluent had been charged, heating was initiated. After thirty minutes, the temperature had reached 200° F. The pressure at this point was 0 pounds per square inch gage. Ethylene was then fed to the reactor until a pressure of three hundred pounds per square inch gage was reached, and after sixteen minutes, the ethylene was turned off. The temperature at this point was 200° F., while the pressure was three hundred pounds per square inch gage. It was found that 136 grams of ethylene had been charged to the reactor. The reaction was allowed to continue for 79 additional minutes, after which the pressure in the reactor was lowered to 230 pounds per square inch gage by venting excess ethylene. After three more minutes, the temperature was 200° F., while the pressure had again risen to 250 pounds per square inch gage. At this point, one thousand cubic centimeters of distilled water was pressured into the reactor and the stirrer was turned on. After 97 minutes, the stirrer was turned off, and after thirty more minutes, the water phase was removed from the reactor. Twenty-five minutes later, two thousand cubic centimeters of distilled water was pressured into the reactor and the stirrer was again turned on. After thirty minutes, the stirrer was turned off, and after thirty more minutes, the water phase was removed from the reactor. Twenty-seven minutes later, one thousand cubic centimeters of distilled water was again pressured into the reactor. The polymer solution and water was stirred together for one-half hour, after which the water phase was removed and the reactor was blown down. The temperature of the reactor contents throughout the water treating steps was 200° F. The color of the water phase from the first treatment was green-black, the color from the second phase was of the same shade but much lighter, while the water phase from the third wash was practically colorless.

A portion of the recovered solid polymer was then washed twice in a Waring Blendor with distilled water using one liter of water in each wash. The other portion of the solid polymer was not washed, and both portions were dried overnight in a vacuum oven at 160° F. The ash content of the unwashed portion was 0.013 weight percent. The total yield of polymer from this run was forty-five grams. The calculated ratio of volumes of treating agent per volume of polymer solution was 2.59.

EXAMPLE XI

A run was made in which propylene was polmerized to high molecular weight solid polymer by a catalytic polymerization employing a catalyst system of titanium trichloride and triisobutylaluminum. This run was carried out by the following procedure.

One gram of titanium trichloride and 1.48 grams of triisobutylaluminum were charged to a one gallon stainless steel reactor by the same charging procedure employed in Example II. After the catalyst and diluent were charged, the reactor was pressured to 40 p.s.i.g. with propylene and heating was initiated. After 44 minutes, the heat was turned off, and the pressure and temperature at this point were 160 p.s.i.g. and 200° F. The reaction was allowed to continue for 81 additional minutes, at which point the temperature was 195° F. The pressure at this time was 20 p.s.i.g. Heat was again supplied to the reactor for one hour, after which the heater was turned off and cooling water was circulated through the cooling jacket. The temperature prior to circulation of the cooling water was 270° F., while the pressure was 50 p.s.i.g. It was found that 220 grams of propylene had been charged to the reactor. After the cooling water had been on for 10 minutes, it was found that the temperature was 250° F., and the pressure was 40 p.s.i.g. At this point, 1,000 cubic centimeters of distilled water was pressured into the reactor, and the stirrer was turned on. The polymer solution was contacted with water at 250° F. for one hour, after which the stirrer was turned off. The water phase was removed 30 minutes later, and after 15 more minutes, an additional 1,000 cubic centimeters of distilled water was charged to the reactor. The stirrer was again turned on, and the polymer solution and water were agitated together for 30 minutes at 250° F. The stirrer was again turned off, and after 30 minutes, the water phase was removed from the reactor. The reactor contents were then blown down, and the solid polymer which resulted was recovered. Approximately two-thirds of the product was washed twice with distilled water in a Waring Blendor, using one liter of water in each wash. The remaining portion of the polymer was not washed in the Waring Blendor, and both portions were then dried overnight in a vacuum oven at 160° F. The total yield of polymer from this run was 198 grams, and it was calculated that the polymer solution contained seventeen weight percent dissolved polymer at the time of water treatment. It was also calculated that the volume ratio of treating agent to polymer solution was 1.17. The ash content of the unwashed portion was 0.054 weight percent, while the washed portion contained 0.02 weight percent ash. Both the washed and unwashed portions (molded) had a light yellowish grey color.

A control run was made employing 3.1 grams of titanium trichloride and 4.6 grams of triisobutylaluminum. The ratio of catalyst components was the same as in the first run of this example. This run was carried out by essentially the same procedure as previously described except that the polymer solution was not treated with water. Instead, the solid polymer was washed twice with distilled water in a Waring Blendor, employing one liter of water in each wash. The yield of polymer in this run was 354 grams, and this polymer had an ash content of 0.32 weight percent. The molded polymer from this run had a yellow-grey color, and it was quite mottled.

The above example serves to illustrate that the treating method of the present invention is also applicable to producing superior polymers from monomers other than ethylene. This example further shows the superiority of polymers produced by the method of this invention over polymers which have not been treated by contacting a solution of the polymer with a treating agent.

EXAMPLE XII

A series of runs was made in which ethylene was polymerized to solid polymer by a catalytic polymerization employing a catalyst system comprising ethylaluminum sesquichloride and tetrabutyl titanate.

In these runs, 2.5 grams of ethylaluminum sesquichloride and 0.75 gram of tetrabutyl titanate were charged to a one-gallon stainless steel reactor by the charging procedure employed in Example II. In these runs, cyclohexane was employed as the diluent.

In these runs, the polymer was treated while in solution with several treating agents which are disclosed in the prior art. After the solid polymer was recovered, it was washed three times in a Waring Blendor with one liter of isopropyl alcohol being used in each wash. The results of these runs are expressed below as Table XI.

*Table XI*

|  | Run No. | | |
| --- | --- | --- | --- |
|  | 15 | 16 | 17 |
| Cubic centimeters diluent used. | 1,500 | 1,500 | 2,000. |
| Reaction time (minutes) | 90 | 155 | 110. |
| Reaction temperature, ° F | 65–175 | 75–195 | 70–225. |
| Reaction pressure—per square inch gage. | 40–300 | 40–300 | 40–300. |
| Yield, grams | 121 | Not measured. | 102.5. |
| Treating agent employed | Ethylene glycol. | Triethanolamine. | Ethylene glycol monoethyl ether. |
| Amount of treating agent, cc | 250 | 150 | 250. |
| Vol. Treating Agent/Vol. Polymer Solution. | 0.154 | Not calculated. | 0.155. |
| Treating temperature, ° F | 270 | 270 | 275. |
| Treating time (minutes at treating temperature). | 240 | 130 | 180. |
| Ash—weight percent | Not measured. | Not measured. | 0.473. |
| Color of molded sample, compression molded at 325° F. | Green | Dark tan, badly mottled. | Dark tan. |

The above runs clearly demonstrate that the treating agents of the prior art are ineffective in reducing the ash content and color of polyethylene which has been prepared by an organometal-catalyzed polymerization.

EXAMPLE XIII

Ethylene is polymerized to high molecular weight solid polymer in a number of catalytic polymerization runs employing one of the following catalyst systems in each respective run: ethylaluminum sesquichloride and titanium hydride; magnesium metal and titanium tetrachloride; calcium hydride and titanium tetrachloride; aluminum metal, ethyl bromide and tetrabutyltitanate; and tetraethyl lead and titanium tetrachloride. In each of these runs cyclohexane is employed as the diluent. At the end of the polymerization period in each run, the temperature within the reactor is raised to a level sufficient to insure that all of the polymer is in solution, after which the polymer solution is contacted with water. After the polymer solution and the water phase of each run are intimately contacted with each other, the phases are allowed to separate, and the water phase is withdrawn. The hydrocarbon phase is then cooled down to precipitate the dissolved polymer, and the polymer is separated from the diluent by filtration. The polymer from each run is then dried in a vacuum oven to remove the last vestiges of adhering diluent. The solid polymer from each of these runs is substantially whiter and of substantially lower ash content than polymers produced by identical catalyst systems in which the solid polymer from each run is washed with a treating agent of the prior art.

We claim:

1. The method of removing impurities from a polymer prepared by catalytic polymerization in the presence of a catalyst having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of said polymer in a relatively inert, non-deleterious solvent, liquid under the conditions of the process containing said impurities and a liquid treating agent immiscible with said solution at a temperature of at least 180° F., forming two separate phases from the contacted materials, namely, a solvent phase containing said polymer and a liquid treating agent phase, said treating agent selectively extracting impurities from the solvent phase, and recovering polymer from said solvent phase.

2. The method of treating a polymer prepared by catalytic polymerization in the presence of a catalyst having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of said polymer in a relatively inert, non-deleterious solvent, liquid under the conditions of the process containing said catalyst as an impurity and an aqueous liquid treating agent immiscible with said solution at a temperature of at least 180° F., forming two separate phases from the contacted materials, namely, a solvent phase containing said polymer and an aqueous liquid treating agent phase, said treating agent selectively extracting impurities from the solvent phase, and recovering polymer from said solvent phase.

3. The method of treating a polymer prepared by catalytic polymerization in the presence of a catalyst having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of said polymer in a relatively inert, non-deleterious solvent, liquid under the conditions of the process containing said catalyst as an impurity and water at a temperature of at least 180° F., forming a water phase and a solvent phase containing said polymer, separating the phases, and recovering polymer from said solvent phase.

4. The method of treating a straight chain monoolefin polymer wherein the monoolefin has from 2 to 8 carbon atoms, said polymer being prepared by catalytic polymerization in the presence of a catalyst having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of said polymer in a relatively inert, non-deleterious solvent, liquid under the conditions of the process containing said catalyst as an impurity and an aqueous liquid treating agent immiscible with said solution at a temperature of at least 180° F. forming two separate phases from the contacted materials, namely, a solvent phase containing said polymer and an aqueous liquid treating agent phase, said treating agent selectively extracting impurities from said solvent phase, and recovering polymer from said solvent phase.

5. The method of treating a polyethylene polymer prepared by catalytic polymerization in the presence of a catalyst having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of said polymer in a relatively inert, non-deleterious solvent, liquid under the conditions of the process containing said catalyst as an impurity and water at a temperature of at least 180° F., forming two separate phases from the contacted materials, namely, a solvent phase containing said polymer and a water phase, said water selectively extracting impurities from said solvent phase, and recovering polymer from said solvent phase.

6. The method of treating a polyethylene polymer prepared by catalytic polymerization in the presence of a catalyst having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of polyethylene in a solvent selected from the group consisting of pentane, isooctane, cyclohexane, methylcyclohexane, benzene and toluene, and 0.1 to 5.0 volumes of water per volume of polymer solution while maintaining a temperature of at least 180° F., forming a water phase and a solvent phase containing said polymer, separating said phases, and recovering polyethylene polymer from the solvent phase.

7. The method of claim 6 wherein 1.0 to 5.0 volumes of water are utilized per volume of polymer solution and the contact time is within the range of 5 to 300 minutes at the treating temperature.

8. A method of making an olefin polymer wherein the olefin is a member of the ethylene series having 2 to 8 carbon atoms having a low ash content which comprises contacting a solution of said olefin polymer in a relatively inert, non-deleterious solvent, liquid under the conditions of the process prepared by catalytic polymerization in the presence of a catalyst having at least two essential components with water at a temperature of at least 180° F., one of said components being a group IV to group VI metal compound and another of said components being selected from the group consisting of organometal compounds, metal hydrides, and metals of groups I, II and III, forming a water phase and a solvent phase containing said polymer, and recovernig polymer from the solvent phase.

9. A method of making a polyethylene having a low ash content which comprises contacting a solution of polyethylene in a solvent selected from the group consisting of pentane, isooctane, cyclohexane, methylcyclohexane, benzene and toluene prepared by catalytic polymerization in the presence of a catalyst having at least two essential components with water at a temperature of at least 180° F., one of said components being a group IV to group VI metal compound and another of said components being selected from the group consisting of organometal compounds, metal hydrides, and metals of groups I, II and III, forming a water phase and a solvent phase containing said polymer, and recovering polymer from the solvent phase.

10. A method of making an olefin polymer wherein the olefin is a member of the ethylene series having two to eight carbon atoms having a low ash content which comprises contacting said olefin polymer prepared by catalytic polymerization in the presence of a catalyst having at least two essential components with 1.0 to 5.0 volumes of water at a temperature of at least 180° F. in the presence of a relatively inert, non-deleterious solvent for the polymer which is liquid under the conditions of the process, one of said components being a group IV to group VI metal compound and another of said components being an organometal compound having the formula $X_mMR_n$ where M is a metal having a valence of 2 to 4, $m$ and $n$ are integers the sum of which is equal to the valence of the metal M, X is hydrogen or a halogen, and R is selected from the group consisting of alkyl, cycloalkyl, and aryl groups having no more than 15 carbon atoms, forming a water phase and a solvent phase containing said polymer, and recovering polymer from the solvent phase.

11. The method of treating a polymer prepared by catalytic polymerization in the presence of a catalyst having at least two essential components, one of said components being a metal compound selected from the group consisting of group IV, group V and group VI metal compounds, and another of said components being selected from the group consisting of organometal compounds, metal hydrides, and metals of groups I, II and III, which comprises contacting a solution of said polymer in a relatively inert, non-deleterious solvent, liquid under the conditions of the process containing said catalyst as an impurity and a liquid treating agent immiscible with said solution at a temperature of at least 180° F., forming two separate phases from the contacted materials, namely, a solvent phase containing said polymer and a liquid treating agent phase, said treating agent selectively extracting impurities from the solvent phase, recovering solid polymer from the solvent phase and washing the solid polymer.

12. A method of making an olefin polymer having a low ash content wherein the olefin is a member of the ethylene series having 2 to 8 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least 180° F., one of said components being selected from the group consisting of group IV metal halides, group V metal halides, group VI metal halides, and group IV metal alcoholates having the formula $X_nM(OR)_m$ where $m+n$ equals the valence of the metal M, X is a halogen, and R is an alkyl, cycloalkyl or aryl group containing no more than 20 carbon atoms, another of said components being an organo-metal compound having the formula $X_mMR_n$ where M is a metal having a valence of 2 to 4, $m$ and $n$ are integers the sum of which is equal to the valence of the metal M, X is hydrogen or a halogen, and R is selected from the group consisting of alkyl, cycloalkyl, and aryl groups having no more than 15 carbon atoms, forming a water phase and a solvent phase containing said polymer, and recovering polymer from the solvent phase.

13. A method of making an olefin polymer having a low ash content wherein the olefin is a member of the ethylene series having 2 to 8 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least 180° F., one of said components being triisobutylaluminum and another of said components being titanium tetrachloride, forming a water phase and a solvent phase containing said polymer, and recovering polymer from the solvent phase.

14. A method of making an olefin polymer having a low ash content wherein the olefin is a member of the ethylene series having 2 to 8 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of a least 180° F., one of said components being ethylaluminum sesquichloride and another of said components being tetrabutyl titanate, forming a water phase and a solvent phase containing said polymer, and recovering polymer from the solvent phase.

15. A method of making an olefin polymer having a low ash content wherein the olefin is a member of the ethylene series having 2 to 8 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least 180° F., one of said components being triethylaluminum and another of said components being titanium tetrachloride, forming a water phase and a solvent phase containing said polymer, and recovering polymer from the solvent phase.

16. A method of making an olefin polymer having a low ash content wherein the olefin is a member of the ethylene series having 2 to 8 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least 180° F., one of said components being triisobutylaluminum and another of said components being titanium trichloride, forming a water phase and a solvent phase containing said polymer, and recovering polymer from the solvent phase.

17. A method of making an olefin polymer having a low ash content wherein the olefin is a member of the ethylene series having 2 to 8 carbon atoms which comprises contacting a solution of said olefin polymer in a relatively inert, non-deleterious solvent, liquid under the conditions of the process, prepared by catalytic polymerization in the presence of a catalyst having at least two essential components, with water at a temperature of at least 180° F., one of he said components being ethylaluminum sesquichloride and another of said components being chromyl chloride, forming a water phase and a solvent phase containing said polymer, and recovering polymer from the solvent phase.

References Cited in the file of this patent

UNITED STATES PATENTS

| | | |
|---|---|---|
| 2,463,866 | Green | Mar. 8, 1949 |
| 2,530,144 | Bannon | Nov. 14, 1950 |
| 2,691,647 | Field et al. | Oct. 12, 1954 |
| 2,762,791 | Pease et al. | Sept. 11, 1956 |
| 2,827,447 | Nowlin et al. | Mar. 18, 1958 |

FOREIGN PATENTS

| | | |
|---|---|---|
| 533,362 | Belgium | May 16, 1955 |

Notice of Adverse Decision in Interference

In Interference No. 91,323 involving Patent No. 2,886,561, W. B. Reynolds and B. H. Ashe, Jr., POLYMERS AND METHOD OF MAKING THE SAME, final judgment adverse to the patentees was rendered July 2, 1962, as to claim 13.

[*Official Gazette March 30, 1965.*]